(12) United States Patent
Di Nicolo' et al.

(10) Patent No.: US 11,565,217 B2
(45) Date of Patent: Jan. 31, 2023

(54) COMPOSITION AND METHOD FOR MANUFACTURING SULFONE POLYMER MEMBRANE

(71) Applicant: Solvay Specialty Polymers Italy S.p.A., Bollate (IT)

(72) Inventors: Emanuele Di Nicolo', Goria Minore (IT); Pasquale Campanelli, Limbiate (IT); Narmandakh Taylor, Cumming, GA (US)

(73) Assignee: SOLVAY SPECIALTY POLYMERS ITALY S.p.A., Bollate (IT)

( * ) Notice: Subject to any disclaimer, the term of this patent is extended or adjusted under 35 U.S.C. 154(b) by 0 days.

(21) Appl. No.: 16/084,756

(22) PCT Filed: Mar. 14, 2017

(86) PCT No.: PCT/EP2017/055984
§ 371 (c)(1),
(2) Date: Sep. 13, 2018

(87) PCT Pub. No.: WO2017/157933
PCT Pub. Date: Sep. 21, 2017

(65) Prior Publication Data
US 2019/0054429 A1    Feb. 21, 2019

Related U.S. Application Data

(60) Provisional application No. 62/308,517, filed on Mar. 15, 2016.

(51) Int. Cl.
*B01D 71/68* (2006.01)
*C08J 5/18* (2006.01)
(Continued)

(52) U.S. Cl.
CPC ......... *B01D 71/68* (2013.01); *B01D 67/0013* (2013.01); *B01D 69/02* (2013.01);
(Continued)

(58) Field of Classification Search
CPC ...... B01D 71/68; B01D 69/06; B01D 69/043; B01D 67/0013; B01D 69/081;
(Continued)

(56) References Cited

U.S. PATENT DOCUMENTS 4,208,508 A   6/1980   Hashino et al.
4,286,015 A   8/1981   Yoshida et al.
(Continued)

FOREIGN PATENT DOCUMENTS

EP          86365 A1    8/1983
JP       2010082573 A    4/2010
(Continued)

OTHER PUBLICATIONS

Kricheldorf H. et al., "New polymer syntheses. LXXXII. Syntheses of poly(ether-sulfone)s from silylated aliphatic diols including chiral monomers", J. Polymer Sci., Part A: Polymer Chemistry, 1995, vol. 33, pp. 2667-2671—John Wiley & Sons Inc.

*Primary Examiner* — Taiwo Oladapo
(74) *Attorney, Agent, or Firm* — Beatrice C. Ortego

(57) ABSTRACT

The invention pertains to a polyaryl ether sulfone polymer solution [solution (SP)] comprising: —at least one sulfone polymer [polymer (PSI)] having recurring units, wherein more than 50% moles, with respect to all the recurring units of polymer (PSI), are recurring units ($R_{PSI}$) selected from the group consisting of those of formulae ($R_{PSI}$-1) and ($R_{PSI}$-2) herein below: ($R_{PSI}$-1) ($R_{PSI}$-2) wherein: —each of E', equal to or different from each other and at each occurrence, is selected from the group consisting of those of formulae (Continued)

(E'-1) to (E'-3): (E'-I) (E'-II) (E'-III) —each R' is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and —j' is zero or an integer of 1 to 4; is a bond or a divalent group optionally comprising one or more than one heteroatom; preferably T is selected from the group consisting of a bond, —$CH_2$—, —C(O)—, —$C(CH_3)_2$—, —$C(CF_3)_2$—, —C(=$CCl_2$)—, —$C(CH_3)(CH_2CH_2$—COOH)—, and a group of formula: (A) —at least one polar organic solvent [solvent (S)]; and —at least one mixture of polyhydroxyl aliphatic alcohols having from 1 to 6 carbon atoms or derivatives thereof [mixture (PHA)], said mixture (PHA) comprising at least one ethylene glycol compound [compound (EthyGly)] and at least one glycerol compound [compound (Gly)], to its use for manufacturing membranes, and to membranes obtained therefrom.

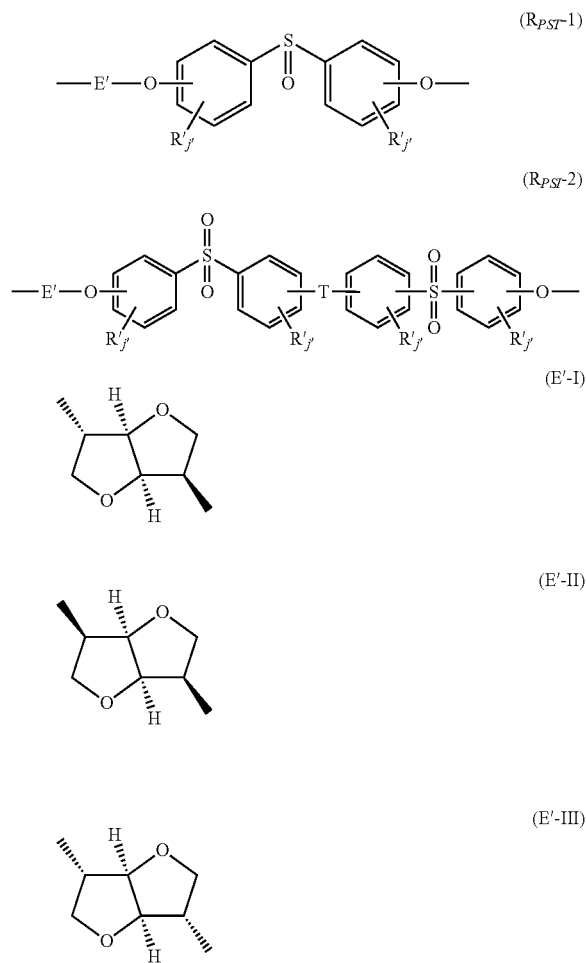

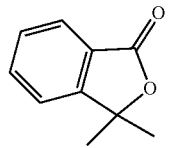

9 Claims, 1 Drawing Sheet

(51) Int. Cl.
   C08G 75/23      (2006.01)
   B01D 69/02      (2006.01)
   B01D 69/08      (2006.01)
   C08J 5/22       (2006.01)
   B01D 67/00      (2006.01)
   B01D 69/04      (2006.01)
   B01D 69/06      (2006.01)
   C08J 3/09       (2006.01)
   B01D 63/02      (2006.01)
   B01D 63/06      (2006.01)

(52) U.S. Cl.
   CPC ........... *B01D 69/043* (2013.01); *B01D 69/06* (2013.01); *B01D 69/081* (2013.01); *C08G 75/23* (2013.01); *C08J 3/09* (2013.01); *C08J 5/18* (2013.01); *C08J 5/2256* (2013.01); *B01D 63/02* (2013.01); *B01D 63/06* (2013.01); *B01D 2325/02* (2013.01); *C08J 2371/02* (2013.01); *C08J 2381/06* (2013.01)

(58) Field of Classification Search
   CPC ........ B01D 69/02; B01D 63/06; B01D 63/02; B01D 2325/02; B01D 69/04; B01D 63/023; C08J 5/2256; C08J 3/09; C08J 5/18; C08J 2371/02; C08J 2381/06; C08G 75/23; C08L 81/06
   See application file for complete search history.

(56) References Cited

U.S. PATENT DOCUMENTS

| | | | |
|---|---|---|---|
| 4,351,860 A * | 9/1982 | Yoshida | B01D 63/021 210/500.28 |
| 8,222,342 B2 | 7/2012 | Weber et al. | |
| 2015/0021260 A1* | 1/2015 | Iwai | B01D 69/10 210/346 |
| 2015/0299395 A1* | 10/2015 | Taylor | C08G 75/23 210/500.28 |
| 2016/0214068 A1 | 7/2016 | Weber et al. | |
| 2016/0288056 A1* | 10/2016 | Bergmann | B01D 71/80 |
| 2017/0240708 A1 | 8/2017 | Lim et al. | |

FOREIGN PATENT DOCUMENTS

| | | | | |
|---|---|---|---|---|
| WO | WO-2013125506 A1 * | 8/2013 | | B01D 63/084 |
| WO | 2014072473 A2 | 5/2014 | | |
| WO | WO2014072473 A1 * | 5/2014 | | |
| WO | 2015032847 A1 | 3/2015 | | |
| WO | WO-2015075178 A1 * | 5/2015 | | B01D 67/0013 |
| WO | 2016032179 A | 3/2016 | | |

* cited by examiner

COMPOSITION AND METHOD FOR MANUFACTURING SULFONE POLYMER MEMBRANE

CROSS-REFERENCE TO RELATED APPLICATION

This application claims priority to U.S. provisional application No. 62/308,517 filed on Mar. 15, 2016, the whole content of this application being incorporated herein by reference for all purposes.

TECHNICAL FIELD

The present invention relates to certain composition including specific polyarylene ether sulfones derived from bio-based feed-stocks and certain additives, a method for the manufacture of membranes using the same, and novel membranes therefrom.

BACKGROUND ART

Aromatic polysulfones having para-linked diphenylenesulfone group as part of their backbone repeat units are a class of thermoplastic polymers characterized by high glass-transition temperatures, good mechanical strength and stiffness, and outstanding thermal and oxidative resistance. By virtue of their mechanical, thermal, and other desirable characteristics, these polymers enjoy an increasingly wide and diversified range of commercial applications, including notably coatings and membranes for wide field of use.

Polyarylene ether sulfones derived from bio-based feed-stocks have been described in the art, as part of efforts oriented towards reduction of the amount of petroleum consumed in the chemical industry and to open new high-value-added markets to agriculture; 1,4:3,6-dianhydrohexitols are examples of such chemicals used as bio-based feed-stock, which because of their bicyclic constrained geometry, and their oxygenated rings can deliver advantageous features when incorporated into poly aryl ether sulfone structures. Also the innocuous character of the molecules opens the possibility of applications in packaging or medical devices, e.g. for haemodialysis membranes.

Depending on the chirality, three isomers of the 1,4:3,6-dianhydrohexitols sugar diol exist, namely isosorbide (1), isomannide (2) and isoidide (3):

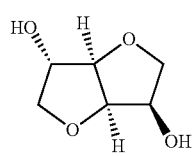

(1)

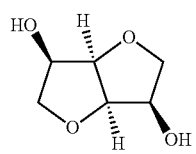

(2)

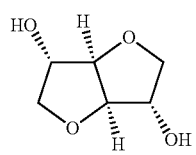

(3)

The 1,4:3,6-dianhydrohexitols are composed of two cis-fused tetrahydrofuran rings, nearly planar and V-shaped with a 120° angle between rings. The hydroxyl groups are situated at carbons 2 and 5 and positioned on either inside or outside the V-shaped molecule. They are designated, respectively, as endo or exo. Isoidide (1) has two exo hydroxyl groups, whereas for isomannide (2) they are both endo, and for isosorbide (3) there is one exo and one endo hydroxyl group. It is generally understood that the presence of the exo substituent increases the stability of the cycle to which it is attached. Also, exo and endo groups exhibit different reactivities since they are more or less accessible depending on the steric requirements of the studied reaction. The reactivity also depends on the existence of intramolecular hydrogen bonds.

Within this frame, Kricheldorf et al. first reported the preparation and characterization of poly(ether sulfone)s containing isosorbide moieties in 1995 (H. Kricheldorf, M. Al Masri, *J. Polymer Sci., Pt A: Polymer Chemistry*, 1995, 33, 2667-2671), although of limited molecular weight and through complex synthetic routes. More recent developments have made available poly ether sulfones comprising isosorbide groups through simpler and more effective synthetic methods, so delivering materials of higher molecular weight through an approach which can be scaled up to industrial level. Hence, WO 2014/072473 (SOLVAY SPECIALTY POLYMERS USA, LLC) 15 May 2014 provides for an improved method of making poly(arylether sulfone) polymers from 1,4:3,6-dianhydrohexitol and certain dihaloaryl compounds which enables obtaining polymers having increased molecular weight. Polysulfone isosorbide materials described therein are taught as notably useful for the manufacture of membranes, although no specific example of the actual manufacture of membranes, and more specifically of hollow fiber membranes, is provided.

Manufacturing techniques for industrial production of membranes generally include the preparation of solutions of polyaryl ether sulfone polymers in suitable solvents, possibly in combination with specific pore forming agents. According to these techniques, a clear polymer solution, often referred to as a dope or a dope solution, is precipitated into two phases: a solid, polymer-rich phase that forms the matrix of the membrane, and a liquid, polymer-poor phase that forms the membrane pores. Polymer precipitation from a solution is generally induced by contacting the dope with a non-solvent, causing hence polymer to coagulate.

In these techniques, it remains nevertheless key to provide for dope solutions of polymer, which are able, when exposed to precipitation conditions, as above detailed, to coagulate in an uniform and regular manner, so as to deliver a structure characterized by high porosity in the form of very small pores, homogeneously distributed throughout the entire membrane section.

The present invention thus provides an advantageous dope solution which enables manufacturing membranes, in particular hollow fiber membranes, possessing high porosity achieved through spongy-like morphology (made of micro-voids), good water permeability and good mechanical properties, yet deprived of large pores/macro-voids of size exceeding 3-5 µm, whose presence is detrimental in certain types of operations, in particular when membranes are intended for use under pressure.

Further, in addition, the hereby provided dope solution is able to deliver the said advantageous spongy-like porosity through the use of water as coagulation bath, with no need of using softer fluids (e.g. alcohols) in the said coagulation bath.

SUMMARY OF INVENTION

Figure 1:
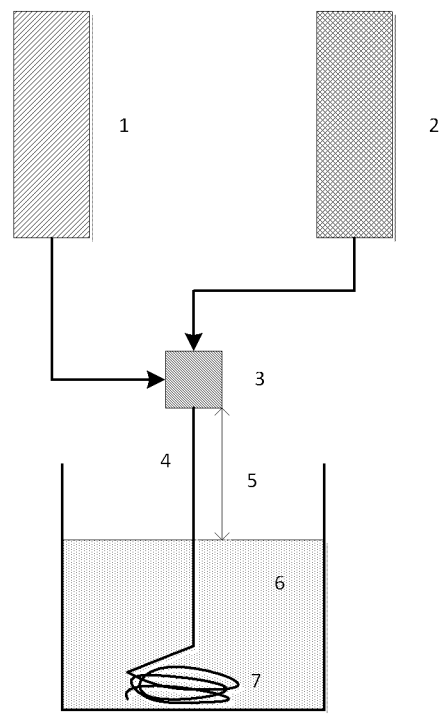
FIG. 1 is a simplified scheme of the hollow fiber spinning machine used for manufacturing hollow fiber membrane.

The invention thus pertains to a polyaryl ether sulfone polymer solution [solution (SP)] comprising:

at least one sulfone polymer [polymer (PSI)] having recurring units, wherein more than 50% moles, with respect to all the recurring units of polymer (PSI), are recurring units ($R_{PSI}$) selected from the group consisting of those of formulae ($R_{PSI}$-1) and ($R_{PSI}$-2) herein below:

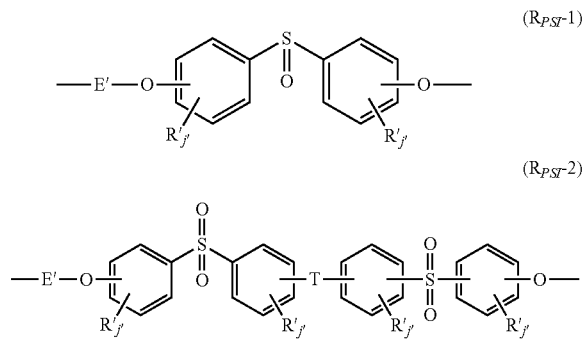

wherein:

each of E', equal to or different from each other and at each occurrence, is selected from the group consisting of those of formulae (E'-1) to (E'-3):

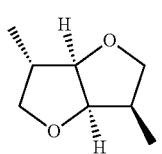
(E'-I)

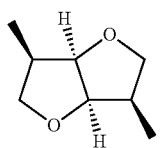
(E'-II)

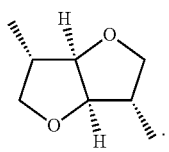
(E'-III)

each R' is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j' is zero or an integer of 1 to 4;

is a bond or a divalent group optionally comprising one or more than one heteroatom; preferably T is selected from the group consisting of a bond, —CH$_2$—, —C(O)—, —C(CH$_3$)$_2$—, —C(CF$_3$)$_2$—, —C(=CCl$_2$)—, —C(CH$_3$) (CH$_2$CH$_2$COOH)—, and a group of formula:

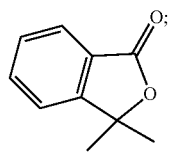

at least one polar organic solvent [solvent (S)]; and at least one mixture of polyhydroxyl aliphatic alcohols having from 1 to 6 carbon atoms or derivatives thereof [mixture (PHA)], said mixture (PHA) comprising at least one ethylene glycol compound [compound (EthyGly)] and at least one glycerol compound [compound (Gly)].

The Applicant has surprisingly found that when the above mentioned solution (SP) is processed to provide membranes, in particular hollow fiber membranes, via non-solvent induced phase separation technique (NIPS technique), outstanding performances are achieved, thanks to the spongy-like microstructure, characterized by voids of very small size, and the substantial absence of large finger-like voids.

The invention further pertains to a method for manufacturing a polyaryl ether sulfone polymer membrane comprising the steps of:

(i) preparing a sulfone polymer solution [solution (SP)], as above described, (ii) processing said solution (SP) into a film;

(iii) contacting said film with a non-solvent bath.

Yet another object of the invention is a microporous membrane possessing a gravimetric porosity ($\varepsilon_m$) of 20 to 90% and comprising pores, wherein at least 90% by volume of the said pores has an average pore diameter of less than 5 μm.

Pores (also referred to as "voids") can be measured taking SEM picture from surfaces of fractured sections of the microporous membrane. Fractured sections are obtained fracturing the microporous membrane in liquid nitrogen in a parallel direction to the intended direction of flow through the membrane; fracturing in the said conditions is efficient in ensuring geometry and morphology to be preserved and avoiding any ductile deformation.

This and other objects, advantages, and features of the invention will be more readily understood and appreciated by reference to the detailed description of the invention.

The Polymer (PSI)

In polymer (PSI), the above recurring units of preferred embodiments ($R_{PSI}$-1), and ($R_{PSI}$-2), can be each present alone or in admixture.

More specifically, recurring units ($R_{PSI}$) of the polymer (PSI) are recurring units of any of formulae ($R_{PSI}$-1a), ($R_{PSI}$-1b), ($R_{PSI}$-1c), ($R_{PSI}$-2a), ($R_{PSI}$-2b), and ($R_{PSI}$-2c):

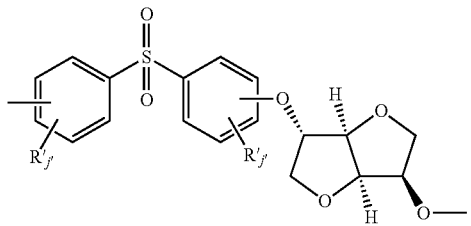
($R_{PSI}$-1a)

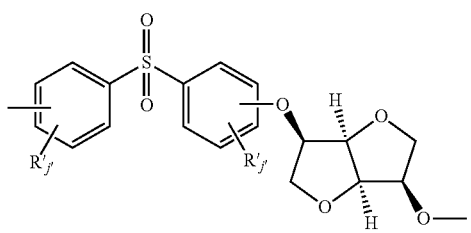
($R_{PSI}$-1b)

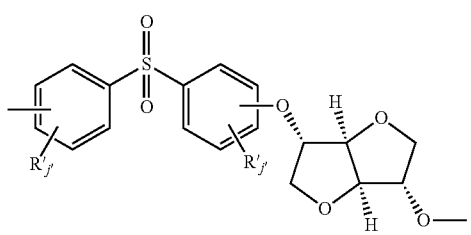
($R_{PSI}$-1c)

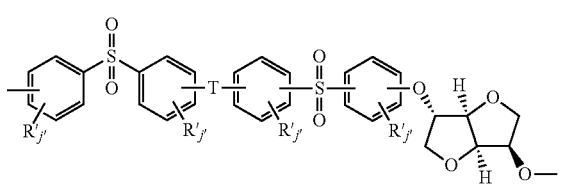
($R_{PSI}$-2a)

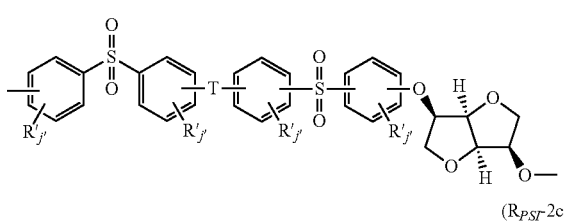
($R_{PSI}$-2b)

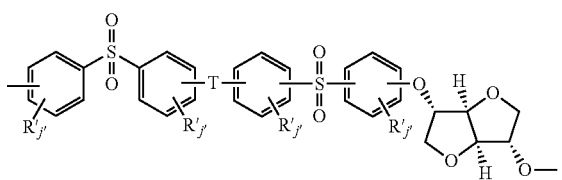
($R_{PSI}$-2c)

wherein:

R', J' and T have the meaning as above defined.

The above recurring units of preferred embodiments ($R_{PSI}$-1a), ($R_{PSI}$-1b), ($R_{PSI}$-1c), ($R_{PSI}$-2a), ($R_{PSI}$-2b), and ($R_{PSI}$-2c), can be each present alone or in admixture.

More preferred recurring units ($R_{PSI}$) are those of formula ($R_{PSI}$-1a) and ($R_{PSI}$-2a), optionally in combination with recurring units of formula ($R_{PSI}$-1b), ($R_{PSI}$-2b), ($R_{PSI}$-1c) and ($R_{PSI}$-2c).

Most preferred recurring units ($R_{PSI}$) are of formula ($R_{PSI}$-1a), optionally in combination with recurring units of formula ($R_{PSI}$-1b) and ($R_{PSI}$-1c).

In recurring unit ($R_{PSI}$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage. Still, in recurring units ($R_{PSI}$) (including ($R_{PSI}$-1), ($R_{PSI}$-2), ($R_{PSI}$-1a), ($R_{PSI}$-1b), ($R_{PSI}$-1c), ($R_{PSI}$-2a), ($R_{PSI}$-2b), and ($R_{PSI}$-2c), j' is at each occurrence zero, that is to say that the phenylene moieties have no other substituents than those enabling linkage in the main chain of the polymer.

Polymer (PSI) may comprise, in addition to recurring units ($R_{PSI}$), as detailed above, recurring units ($R_S$) comprising a Ar—$SO_2$-Ar' group, with Ar and Ar', equal to or different from each other, being aromatic groups, said recurring units ($R_s$) generally complying with formulae (S1):

$$\text{-Ar}^5\text{-(T'-Ar}^6)_n\text{-O-Ar}^7\text{-SO}_2\text{-[Ar}^8\text{-(T-Ar}^9)_n\text{-SO}_2]_m\text{-Ar}^{10}\text{-O—} \quad (S1)$$

wherein:

$Ar^5$, $Ar^6$, $Ar^7$, $Ar^8$, and $Ar^9$, equal to or different from each other and at each occurrence, are independently an aromatic mono- or polynuclear group;

T and T', equal to or different from each other and at each occurrence, is independently a bond or a divalent group optionally comprising one or more than one heteroatom; preferably T and T' are selected from the group consisting of a bond, —$CH_2$—, —C(O)—, —$C(CH_3)_2$—, —$C(CF_3)_2$—, —C(=$CCl_2$)—, —$C(CH_3)(CH_2CH_2COOH)$—, —$SO_2$— and a group of formula:

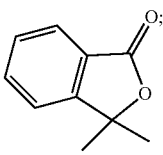

most preferably, T' is a bond, —$SO_2$—, or —$C(CH_3)_2$— and T is a bond;

n and m, equal to or different from each other, are independently zero or an integer of 1 to 5.

Recurring units ($R_S$) can be notably selected from the group consisting of those of formulae (S-A) to (S-D) herein below:

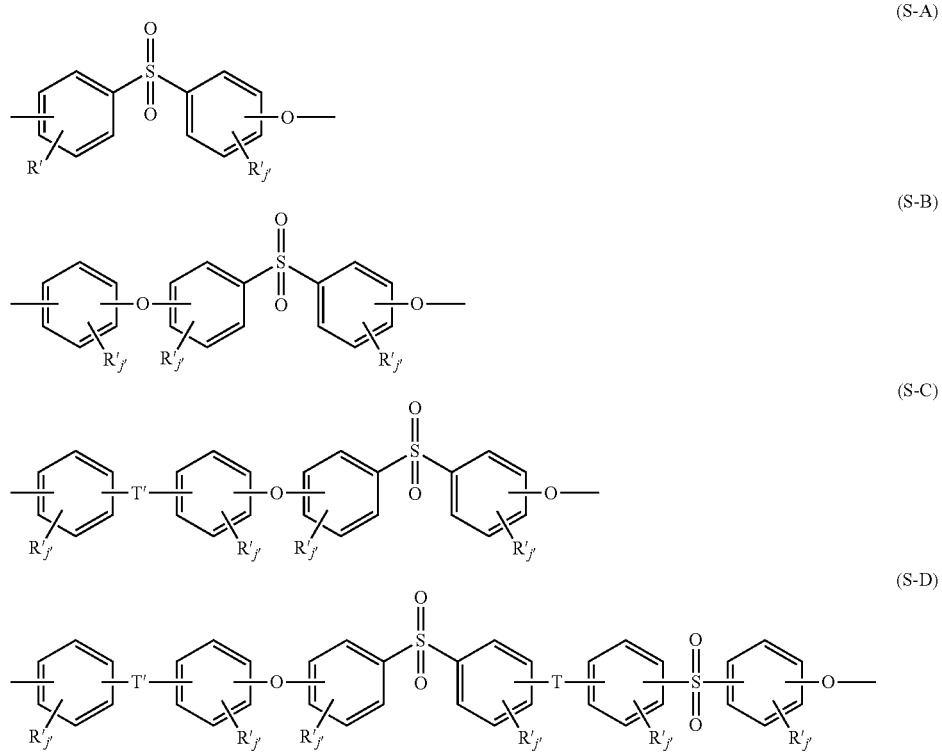

wherein:

each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

T and T', equal to or different from each other are a bond or a divalent group optionally comprising one or more than one heteroatom; preferably T and T' are selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, —SO$_2$—, and a group of formula:

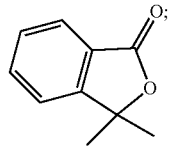

most preferably, T' is a bond, —SO$_2$—, or —C(CH$_3$)$_2$— and T is a bond. In recurring unit (R$_S$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage. Still, in recurring units (R$_S$), j' is at each occurrence zero, that is to say that the phenylene moieties have no other substituents than those enabling linkage in the main chain of the polymer.

Recurring units (R$_S$) of formula (S-D) are preferably selected from the group consisting of the following recurring units:

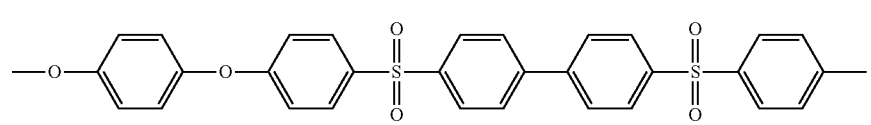

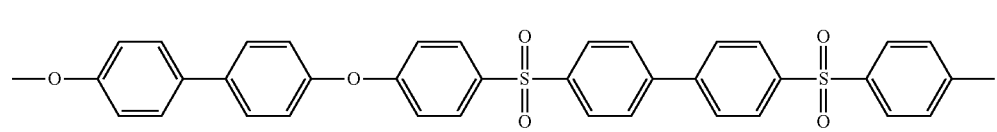

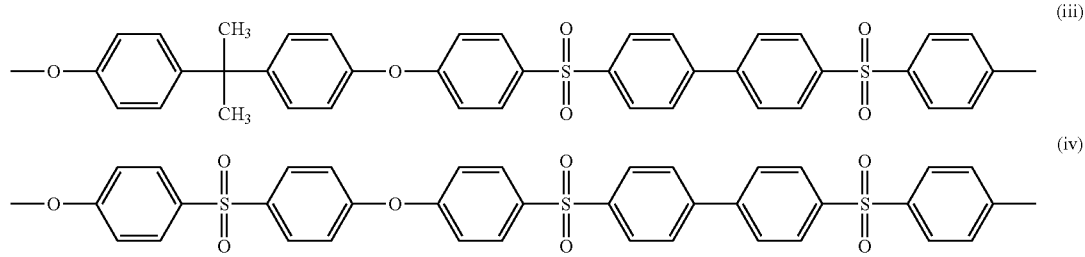

and mixtures thereof.

Recurring units (R$_S$) complying with formula (S-C), as above detailed, are preferably selected from the group consisting of the following units:

(j)

(jj)

(jjj)

(jv)

and mixtures thereof.

The polymer (PSI) has in general a weight averaged molecular weight of at least 20 000, preferably at least 30 000, more preferably at least 40 000.

The weight average molecular weight (M$_w$) and the number average molecular weight (M$_n$) can be estimated by gel-permeation chromatography (GPC) using ASTM D5296 calibrated with polystyrene standards.

The polydispersity index (PDI) is hereby expressed as the ratio of weight average molecular weight (M$_w$) to number average molecular weight (M$_n$).

The polymer (PSI) generally has a polydispersity index of less than 2.5, preferably of less than 2.4, more preferably of less than 2.2. This relatively narrow molecular weight distribution is representative of an ensemble of molecular chains with similar molecular weights and substantially free from oligomeric fractions, which might have a detrimental effect on polymer properties.

The polymer (PSI) advantageously possesses a glass transition temperature (T$_g$) of at least 200° C., preferably 210° C., more preferably at least 220° C. Such high glass transition temperatures are advantageous for extending temperatures range of use of the polymer (PSI).

Glass transition temperature (T$_g$) is generally determined by DSC, according to ASTM D3418.

The polymer (PSI) comprises recurring units (R$_{PSI}$), as above detailed, in an amount of more than 50% moles, preferably more than 60% moles, more preferably more than 75% moles, even more preferably more than 80% moles, with respect to all the recurring units of polymer (PSI).

When recurring units different from units (R$_{PSI}$) are present in polymer (PSI), the same are generally selected from recurring units (R$_S$), as above detailed, so that polymer (PSI) essentially consists of recurring units (R$_{PSI}$), as above detailed, and, optionally, recurring units (R$_S$), as above detailed.

End chains, defects, and minor amounts (<1% moles, with respect to all the recurring units of polymer (PSI)) of recurring units other than recurring units (R$_{PSI}$), and recurring units (R$_S$), may be present, without this presence substantially affecting the properties of the polymer (PSI).

It is generally understood that good results can be achieved using a polymer (PSI) wherein substantially all recurring units are recurring units (R$_{PSI}$), as above detailed.

The expression "substantially" in combination with the recited amount of recurring units (R$_{PSI}$) is hereby intended to mean that minor amounts, generally below 1% moles, preferably below 0.5% moles, of other recurring units may be tolerated, e.g. as a result of lower purity in monomers used.

The overall concentration of the polymer (PSI) in the solution (SP) should be at least 10% by weight, preferably at least 12% by weight, based on the total weight of the solution. Typically the concentration of the polymer (PSI) in the solution does not exceed 50% by weight, preferably it does not exceed 40% by weight, more preferably it does not exceed 30% by weight, based on the total weight of the solution (SP).

Concentration of polymer (PSI) ranging between 15 and 25% wt, and more preferably between 16 and 22% wt, with respect to the total weight of solution (SP) have been found particularly advantageous.

The Solvent (S)

The solution (SP) comprises polymer (PSI) in a polar organic solvent [solvent (S)].

The term "solvent" is used herein in its usual meaning, that is it indicates a substance capable of dissolving another substance (solute) to form an uniformly dispersed mixture at the molecular level. In the case of a polymeric solute it is common practice to refer to a solution of the polymer in a solvent when the resulting mixture is transparent and no phase separation is visible in the system. Phase separation is taken to be the point, often referred to as "cloud point", at which the solution becomes turbid or cloudy due to the formation of polymer aggregates.

Exemplary embodiments of solvents (S) which may be used, alone or in combination, in the composition of the present invention include notably:

aromatic hydrocarbons and more particularly aromatic hydrocarbons such as, in particular, benzene, toluene, xylenes, cumene, petroleum fractions composed of a mixture of alkylbenzenes;

aliphatic or aromatic halogenated hydrocarbons including more particularly, perchlorinated hydrocarbons such as, in particular, tetrachloroethylene, hexachloroethane; partially chlorinated hydrocarbons such as dichloromethane, chloroform, 1,2-dichloroethane, 1,1,2-trichloroethane, 1,1,2,2-tetrachloroethane, pentachloroethane, trichloroethylene, 1-chlorobutane, 1,2-dichlorobutane; monochlorobenzene, 1,2-dichlorobenzene, 1,3-dichlorobenzene, 1,4-dichlorobenzene, 1,2,4-trichlorobenzene or mixture of different chlorobenzenes;

aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; 1,4-dioxane, tetrahydrofuran (THF);

aromatic amines, including notably pyridine, and aniline.

ketones such as methylethylketone, methylisobutyl ketone, diisobutylketone, cyclohexanone, isophorone;

linear or cyclic esters such as: isopropyl acetate, n-butyl acetate, methyl acetoacetate, dimethyl phthalate, γ-butyrolactone;

linear or cyclic carboxamides such as N,N-dimethylacetamide (DMAc), N,N-diethylacetamide, dimethylformamide (DMF), diethylformamide or N-methyl-2-pyrrolidinone (NMP);

organic carbonates for example dimethyl carbonate, diethyl carbonate, dipropyl carbonate, dibutyl carbonate, ethylmethyl carbonate, ethylene carbonate, vinylene carbonate;

phosphoric esters such as trimethyl phosphate, triethyl phosphate;

dimethylsulfoxide (DMSO); and diesters of formula ($I_{de}$), ester-amides of formula ($I_{ea}$), or diamides of formula ($I_{da}$):

$$R^1-OOC-A_{de}-COO-R^2 \quad (I_{de})$$

$$R^1-OOC-A_{ea}-CO-NR^3R^4 \quad (I_{ea})$$

$$R^5R^6N-OC-A_{da}-CO-NR^5R^6 \quad (I_{da})$$

wherein:
$R^1$ and $R^2$, equal to or different from each other, are independently selected from the group consisting of $C_1$-$C_{20}$ hydrocarbon groups;
$R^3$, $R^4$, $R^5$ and $R^6$ equal to or different from each other and at each occurrence, are independently selected from the group consisting of hydrogen, $C_1$-$C_{36}$ hydrocarbon groups, possibly substituted, being understood that $R^3$ and $R^4$ might be part of a cyclic moiety including the nitrogen atom to which they are bound, said cyclic moiety being possibly substituted and/or possibly comprising one or more than one additional heteroatom, and mixtures thereof;
$A_{de}$, $A_{ea}$, and $A_{da}$ equal to or different from each other, are independently a linear or branched divalent alkylene group.

According to certain embodiments, solvent (S) is at least one of the group consisting of NMP, DMAc, pyridine, aniline, 1,1,2-trichloroethane and 1,1,2,2-tetrachloroethane, tetrahydrofuran (THF), 1,4 dioxane, chloroform, dichloromethane, and chlorobenzene.

Very good results have been obtained when the solvent (S) was NMP.

According to alternative embodiments of the invention, solvent (S) is at least one of a diester of formula ($I_{de}$), or an ester-amide of formula ($I_{ea}$), possibly in admixture with a diamides of formula ($I_{da}$), wherein A in formulae ($I_{de}$), ($I_{ea}$) and ($I_{da}$) is $C_3$-$C_{10}$ branched divalent alkylene.

According to this first alternative embodiment, A is preferably selected from the group consisting of the following:
$A_{MG}$ groups of formula $MG_a$ —CH(CH$_3$)—CH$_2$—CH$_2$— or $MG_b$ —CH$_2$—CH$_2$—CH(CH$_3$)—,
$A_{ES}$ groups of formula $ES_a$ —CH(C$_2$H$_5$)—CH$_2$—, or $ES_b$—CH$_2$—CH(C$_2$H$_5$)—; and
mixtures thereof.

In one more preferred variant of this embodiment, the solvent (S) comprises, possibly in addition to DMSO:
(i) at least one of the diester ($I'_{de}$) and at least one diester ($I''_{de}$), possibly in combination with at least one diester of formula ($II_{de}$); or
(ii) at least one of the esteramide ($I'_{ea}$) and at least one esteramide ($I''_{ea}$), possibly in combination with at least one esteramide of formula ($II_{ea}$);
(iii) at least one of the esteramide ($I'_{ea}$), at least one diamide ($I'_{da}$), at least one esteramide ($I''_{ea}$) and at least one diamide ($I''_{da}$), possibly in combination with at least one esteramide of formula ($II_{ea}$) and/or at least one diamide of formula ($II_{da}$); or
(iv) combinations of (i) with (ii) and/or (iii),
wherein:
($I'_{de}$) is $R^1$—OOC-$A_{MG}$-COO—$R^2$
($I'_{ea}$) is $R^1$—OOC-$A_{MG}$-CO—NR$^3$R$^4$
($I'_{da}$) is $R^5R^6$N—OC-$A_{MG}$-CO—NR$^5$R$^6$
($I''_{de}$) is $R^1$—OOC-$A_{ES}$-COO—$R^2$
($I''_{ea}$) is $R^5R^6$N—OC-$A_{ES}$-CO—NR$^5$R$^6$; and
($II_{de}$) is $R^1$—OOC—(CH$_2$)$_4$—COO—$R^2$,
($II_{ea}$) is $R^1$—OOC—(CH$_2$)$_4$—CO—NR$^3$R$^4$,
($II_{da}$) is $R^5R^6$N—OC—(CH$_2$)$_4$—CO—NR$^5$R$^6$,
wherein:
$A_{MG}$ is of formula $MG_a$ —CH(CH$_3$)—CH$_2$—CH$_2$— or $MG_b$ —CH$_2$—CH$_2$—CH(CH$_3$)—,
$A_{ES}$ is of formula $ES_a$ —CH(C$_2$H$_5$)—CH$_2$—, or $ES_b$—CH$_2$—CH(C$_2$H$_5$)—; and
wherein $R^1$ and $R^2$, equal to or different from each other, are independently selected from the group consisting of $C_1$-$C_{20}$ alkyl, $C_1$-$C_{20}$ aryl, $C_1$-$C_{20}$ alkyaryl, $C_1$-$C_{20}$ arylalkyl groups;
$R^3$, $R^4$, $R^5$ and $R^6$, equal to or different from each other and at each occurrence, are selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, all said groups possibly comprising one or more than one substituent, possibly having one or more than one heteroatom, and of cyclic moieties comprising both (1) $R^3$ and $R^4$ or $R^5$ and $R^6$ and (2) the nitrogen atom to which they are bound, said cyclic moieties possibly comprising one or more than one heteroatom, e.g. an oxygen atom or an additional nitrogen atom.

In above mentioned formulae ($I'_{de}$), ($I''_{de}$), and ($II_{de}$), ($I'_{ea}$), ($I''_{ea}$) and ($II_{ea}$), ($I'_{da}$), ($I''_{da}$) and ($II_{da}$), $R^1$ and $R^2$ are preferably methyl groups, while $R^3$, $R^4$, $R^5$ and $R^6$ equal to or different from each other and at each occurrence, are preferably selected from the group consisting of methyl, ethyl, hydroxyethyl.

In this preferred variant of this embodiment, the solvent (S) preferably consists essentially of any of (i), (ii), (iii) or (iv) mixtures, possibly in combination with DMSO. Other minor components might be present, preferably in an amount not exceeding 1% wt over the entire weight of the solvent (S), provided they do not substantially modify the properties of solvent (S).

According to this variant, solvent (S) can comprise (or consist essentially of), possibly in addition to DMSO:

(j) a diester mixture consisting essentially of:
from 70 to 95% by weight of diester of formula ($I'_{de}$);
from 5 to 30% by weight of diester of formula ($I''_{de}$), and
from 0 to 10% by weight of diester of formula ($II_{de}$), as above detailed; or (jj) an esteramide mixture consisting essentially of:
from 70 to 95% by weight of esteramide of formula ($I'_{ea}$);
from 5 to 30% by weight of esteramide of formula ($I''_{ea}$), and
from 0 to 10% by weight of any of esteramide of formula ($II_{ea}$), as above detailed; or (jjj) an esteramide/diamide mixture consisting essentially of
from 70 to 95% by weight of esteramide of formula ($I'_{ea}$) and diamide of formula ($I'_{da}$), with ($I'_{da}$) representing from 0.01 to 10% by weight of cumulative weigh of ($I'_{ea}$) and ($I'_{da}$);
from 5 to 30% by weight of esteramide of formula ($I''_{ea}$) and diamide of formula ($I''_{da}$), with ($I''_{da}$) representing from 0.01 to 10% by weight of cumulative weigh of ($I''_{ea}$) and ($I''_{da}$) and
from 0 to 10% by weight of any of esteramide of formulae ($II_{ea}$) and diamide ($II_{da}$), as above detailed; or mixtures of (j) with (jj) and/or (jjj) as above detailed.

An example of the useful diester-based mixture wherein A is branched is RHODIASOLV® IRIS solvent, commercialized by Solvay.

RHODIASOLV® IRIS solvent is a mixture of diesters comprising essentially (more than 80 wt %) of dimethyl ethylsuccinate and dimethyl 2-methylglutarate.

In one other embodiment, solvent (S) is at least one of a diester of formula ($I_{de}$), or an ester-amides of formula ($I_{ea}$), possibly in admixture with a diamides of formula ($I_{da}$), wherein A in formulae ($I_{de}$), ($I_{ea}$) and ($I_{da}$) is a linear divalent alkylene group of formula $(CH_2)_r$, wherein r is an integer of from 2 to 4.

In a variant of this embodiment, the solvent (S) comprises, possibly in addition to DMSO:

(k) at least one of the diester of formula ($III^4_{de}$), the diester of formula ($III^3_{de}$), and the diester of formula ($III^2_{de}$); or (kk) at least one of the esteramide ($III^4_{ea}$), the esteramide ($III^3_{ea}$), and the esteramide of formula ($III^2_{ea}$); or (kkk) at least one of the esteramide of formula ($III^4_{ea}$), the esteramide of formula ($III^3_{ea}$), and the esteramide of formula ($III^2_{ea}$), and at least one of the diamide of formula ($III^4_{da}$), the diamide of formula ($III^3_{da}$), and the diamide of formula ($III^2_{da}$); or (kv) combinations of (k) with (kk) and/or (kkk), wherein:

($III^4_{de}$) is $R^1$—OOC—$(CH_2)_4$—COO—$R^2$
($III^3_{de}$) is $R^1$—OOC—$(CH_2)_3$—COO—$R^2$
($III^2_{de}$) is $R^1$—OOC—$(CH_2)_2$—COO—$R^2$
($III^4_{ea}$) is $R^1$—OOC—$(CH_2)_4$—CO—$NR^3R^4$
($III^3_{ea}$) is $R^1$—OOC—$(CH_2)_3$—CO—$NR^3R^4$
($III^2_{ea}$) is $R^1$—OOC—$(CH_2)_2$—CO—$NR^3R^4$
($III^4_{da}$) is $R^5R^6N$—OC—$(CH_2)_4$—CO—$NR^5R^6$
($III^3_{da}$) is $R^5R^6N$—OC—$(CH_2)_3$—CO—$NR^5R^6$
($III^2_{da}$) is $R^5R^6N$—OC—$(CH_2)_2$—CO—$NR^5R^6$ wherein $R^1$ and $R^2$, equal to or different from each other, are independently $C_1$-$C_{20}$ alkyl, $C_1$-$C_{20}$ aryl, $C_1$-$C_{20}$ alkyaryl, $C_1$-$C_{20}$ arylalkyl groups;

$R^3$, $R^4$, $R^5$ and $R^6$, equal to or different from each other and at each occurrence, are selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, all said groups possibly comprising one or more than one substituent, possibly having one or more than one heteroatom, and of cyclic moieties comprising both (1) $R^3$ and $R^4$ or $R^5$ and $R^6$ and (2) the nitrogen atom to which they are bound, said cyclic moieties possibly comprising one or more than one heteroatom, e.g. an oxygen atom or an additional nitrogen atom.

In above mentioned formulae ($III^4_{de}$), ($III^3_{de}$), ($III^2_{de}$), ($III^4_{ea}$), ($III^3_{ea}$), and ($III^2_{ea}$), ($III^4_{da}$), ($III^3_{da}$), and ($III^2_{da}$), $R^1$ and $R^2$ are preferably methyl groups, while $R^3$, $R^4$, $R^5$ and $R^6$, equal to or different from each other, are preferably selected from the group consisting of methyl, ethyl, hydroxyethyl.

According to certain preferred variant of this embodiment, solvent (S) can comprise, possibly in addition to DMSO:

(I) a diester mixture consisting essentially of dimethyladipate (r=4), dimethylglutarate (r=3) and dimethylsuccinate (r=2); or (II) an esteramide mixture consisting essentially of $H_3COOC$—$(CH_2)_4$—CO—$N(CH_3)_2$, $H_3COOC$—$(CH_2)_3$—CO—$N(CH_3)_2$, and $H_3COOC$—$(CH_2)_2$—CO—$N(CH_3)_2$; or (III) a diester mixture of diethyladipate (r=4), dimethylglutarate (r=3) and diethylsuccinate (r=2); or (IV) an esteramide mixture consisting essentially of $H_5C_2OOC$—$(CH_2)_4$—CO—$N(CH_3)_2$, $H_5C_2OOC$—$(CH_2)_3$—CO—$N(CH_3)_2$, and $H_5C_2OOC$—$(CH_2)_2$—CO—$N(CH_3)_2$; or (v) a mixture of diisobutyladipate (r=4), diisobutylglutarate (r=3) and diisobutylsuccinate (r=2); or (vI) an esteramide mixture consisting essentially of $H_9C_4OOC$—$(CH_2)_4$—CO—$N(CH_3)_2$, $H_9C_4OOC$—$(CH_2)_3$—CO—$N(CH_3)_2$, and $H_9C_4OOC$—$(CH_2)_2$—CO—$N(CH_3)_2$; or (vII) mixtures thereof.

An exemplary embodiment of the variant listed above under section (I) is a diester mixture consisting essentially of:
from 9 to 17% by weight of dimethyladipate;
from 59 to 67% by weight of dimethylglutarate; and
from 20 to 28% by weight of dimethylsuccinate.

An example of a useful diester-based mixture wherein A is linear is RHODIASOLV® RPDE solvent, marketed by Solvay.

RHODIASOLV® RPDE solvent is a mixture of diesters comprising essentially (more than 70 wt %) of dimethylglutarate and dimethylsuccinate.

According to certain other embodiments, solvent (S) comprises dimethylsulfoxide (DMSO) and at least one solvent selected from the group consisting of diesters of formula ($I_{de}$) and ester-amide of formula ($I_{ea}$).

The weight ratio between the solvents of formula ($I_{de}$) and ($I_{ea}$) and DMSO, in these embodiments, is preferably from 1/99 to 99/1, preferably of from 20/80 to 80/20, more preferably of 70/30 to 30/70. The skilled in the art will select the appropriate weight ratio for opportunely tuning properties of the solvent (S) in the inventive composition.

The overall concentration of the solvent (S) in the solution (SP) should be at least 20% by weight, preferably at least 30% by weight, based on the total weight of the solution. Typically the concentration of the solvent (S) in the solution does not exceed 70% by weight, preferably it does not exceed 65% by weight, more preferably it does not exceed 60% by weight, based on the total weight of the solution (SP).

The Mixture (PHA)

The composition comprises at least one mixture of (poly) hydroxyl aliphatic alcohols having from 1 to 6 carbon atoms or derivatives thereof [mixture (PHA)], said mixture (PHA) comprising at least one ethylene glycol compound [compound (EthyGly)] and at least one glycerol compound [compound (Gly)].

The expression "ethylene glycol compound" or compound (EthyGly) is intended to encompass ethylene glycol and dimers and trimers thereof, as well as mono-ether and mono-ester derivatives, to the extent that the ethylene glycol compound comprises at least one free hydroxyl group.

The expression "glycerol compound" or compound (Gly) is intended to encompass glycerol and dimers thereof, as well as mono-ether, di-ether, mono-ester and di-ester derivatives, to the extent that the glycerol compound comprises at least one free hydroxyl group.

Preferred compounds (EthyGly) are selected from the group consisting of ethylene glycol, diethylene glycol (DEG), triethylene glycol (TEG), aliphatic mono-ethers and mono-esters, in particular methyl, ethyl or butyl mono-ethers and acetyl monoesters. Ethylene glycol remains the compound of choice in view of its performances/easy availability/costs balance.

Preferred compounds (Gly) are selected from the group consisting of glycerol, aliphatic mono- and di-esters thereof, in particular mono-acetyl glycerol, di-acetyl glycerol, aliphatic mono- and di-ethers thereof, in particular methyl, ethyl or butyl mono-ethers or di-ethers, including notably mono-ter-butyl-glycerol, di-ter-butyl-glycerol; glycerol carbonate; glycerol acetals derived from aliphatic aldehydes, including butanal, pentanal, hexanal, octanal and decanal glycerol acetals; glycerol remains the compound of choice in view of its performances/easy availability/costs balance.

The Applicant has found that the addition of mixture (PHA) is particularly beneficial for achieving optimal membrane morphology. Without being bound by this theory, it is generally understood that the addition of an amount of mixture (PHA) in solution (SP) will increase the rate of demixing/coagulation, so as to provide a more advantageous membrane morphology.

The overall concentration of the mixture (PHA) in the solution (SP) should be at least 1% by weight, preferably at least 2% by weight, based on the total weight of the solution. Typically the concentration of the polymer (PSI) in the solution does not exceed 20% by weight, preferably it does not exceed 15% by weight, more preferably it does not exceed 14% by weight, based on the total weight of the solution (SP).

The weight ratio between compound (EthyGly) and compound (Gly) is generally comprised between 10:90 to 90:10, preferably 20:80 to 80:20, more preferably of 30:70 to 70:30.

The Solution (SP)

The solution (SP) may contain additional components, such as pore forming agents, nucleating agents, fillers and the like.

Generally, a pore forming agent [agent (A)] will be used, in particular when the solution (SP) is intended for the manufacture of a hollow fiber membrane.

Suitable pore forming agents are notably polyvinylpyrrolidone (PVP), and polyethyleneglycol (PEG) having a molecular weight of at least 200.

The pore forming agent, when added to the solution (SP), it is present in amounts typically ranging from 0.1 to 40% by weight, preferably from 0.5 to 40% by weight.

When PEG pore forming agents are used, their amounts is generally of from 30 to 40% wt, with respect to the total weight of solution (SP); when PVP pore forming agents are employed, their amounts is generally of 2 to 10% wt, with respect to the total weight of solution (SP).

Particularly good results have been obtained with solutions (SP) wherein the agent (A) is a polyethyleneglycol (PEG), as above detailed.

The Method

As explained above, the invention further pertains to a method for manufacturing a polyaryl ether sulfone polymer membrane comprising the steps of:

(i) preparing a polyaryl ether sulfone polymer solution [solution (SP)], as above described,
(ii) processing said solution (SP) into a film;
(iii) contacting said film with a non-solvent bath.

The solution (SP) can be prepared in step (i) by any conventional manner. For instance, the solvent (S) can be added to the polymer (PSI), followed by mixture (PHA), and possibly agent (A), or, preferably, the polymer (PSI) can be admixed with agent (A) and mixture (PHA) before being contacted with the solvent (S). No specific effects can be associated to the order of contacting combining the ingredients.

Step (i) is generally carried out at a temperature of advantageously at least 25° C., preferably at least 30° C., more preferably at least 40° C. and even more preferably at least 45° C. Step (i) is generally carried out at a temperature of advantageously less than 180° C., preferably less than 170° C., more preferably less than 160° C., and even more preferably less than 150° C. Higher temperatures can of course be used for the solution (SP) preparation step (i), however they are not preferred from a practical and/or economical point of view.

The mixing time required to obtain the solution (SP) can vary widely depending upon the rate of solution of the components, the temperature, the efficiency of the mixing apparatus, the viscosity of the solution (SP) being prepared, and the like.

Any suitable mixing equipment may be used. Preferably, the mixing equipment is selected to reduce the amount of air entrapped in the solution (SP) which may cause defects in the final membrane. The mixing of the polymer (P), the solvent (S) and the mixture (PHA) may be conveniently carried out in a sealed container, optionally held under an inert atmosphere. Inert atmosphere, and more precisely nitrogen atmosphere has been found particularly advantageous for the preparation of solution (SP).

In general the solubility of the polymer (PSI) in the solution (SP) at the temperature of the solution during the step (ii) of the method of the invention should be greater than 10% by weight, preferably greater than 12% by weight, more preferably greater than 15% by weight, with respect to the total weight of the solution (SP).

The term "solubility" is defined herein as the maximum amount of polymer, measured in terms of weight of the polymer per weight of solution, which dissolves at a given temperature affording a transparent homogeneous solution without the presence of any phase separation in the system.

For this reason, step (ii) may be carried out at temperatures exceeding room temperature. Once a homogenous and transparent solution (SP) is prepared, the solution (SP) is processed into a film.

The term "film" is used herein to refer to the layer of solution (SP) obtained after the processing of the same. Depending on the final form of the membrane the film may be either flat, when flat membranes are to be manufactured, or tubular in shape, when tubular or hollow fiber membranes are to be obtained.

The temperature during the processing step (ii) may be or may be not the same as the temperature during the preparation step (i). The temperature of the solution (SP) during the processing step (ii) typically does not exceed 180° C., preferably it does not exceed 170° C., more preferably it does not exceed 160° C., even more preferably it does not exceed 150° C.

During the processing step (ii) the solution (SP), lower boundary for the processing temperature are not critical, provided that the solution (SP) still maintains adequate solubility and viscosity properties. Ambient temperature can be notably used.

From practical perspective, nevertheless, temperature of the solution (SP) during the processing step (ii) generally is comprised between 30° C. and 70° C., preferably between 30° C. and 50° C.

The viscosity of the solution (SP) at the temperature of the processing step (ii) is typically at least 1 Pa·s. The viscosity of the solution (SP) in said conditions typically does not exceed 100 Pa·s. This viscosity window can be adapted adjusting notably polymer (PSI), mixture (PHA), agent (A) and solvent (S) relative proportions in the solution (SP), and through additional adjustment of the temperature, as mentioned above.

Conventional techniques can be used for processing the solution (SP) into a film, including casting and wet-spinning.

Different casting techniques can be used depending on the final form of the membrane to be manufactured. When the final product is a flat membrane the polymer solution is cast as a film over a flat support, typically a plate, a belt or a fabric, or another microporous supporting membrane, by means of a casting knife or a draw-down bar.

Accordingly, in its first embodiment the method of the invention comprises a step (ii) of casting the solution (SP) into a flat film on a support.

Hollow fibers and capillary membranes can be obtained by the so-called wet-spinning process. In such a process the solution (SP) is generally pumped through a spinneret, that is an annular nozzle comprising at least two concentric capillaries: a first outer capillary for the passage of the solution (SP) and a second inner one for the passage of a supporting fluid, generally referred to as "lumen". The lumen acts as the support for the casting of the solution (SP) and maintains the bore of the hollow fiber or capillary precursor open. The lumen may be a gas, or, preferably, a liquid at the conditions of the spinning of the fiber. The selection of the lumen and its temperature depends on the required characteristics of the final membrane as they may have a significant effect on the size and distribution of the pores in the membrane. In general the lumen is not a strong non-solvent for the polymer (PSI) or, alternatively, it contains a solvent or weak solvent for the polymer (PSI). The lumen is typically miscible with the non-solvent and with the solvent (S) for the polymer (PSI). The temperature of the lumen generally approximates the temperature of the solution (SP).

At the exit of the spinneret, after a short residence time in air or in a controlled atmosphere, the hollow fiber or capillary precursor is contacted with a non-solvent, and more specifically it is generally immersed in the non-solvent bath wherein the polymer precipitates forming the hollow fiber or capillary membrane.

Accordingly, in its second embodiment the process of the invention comprises a step (ii) of casting the polymer solution into a tubular film around a supporting fluid.

The casting of the polymer solution is typically done through a spinneret. The supporting fluid forms the bore of the final hollow fiber or capillary membrane. When the supporting fluid is a liquid, immersion of the fiber precursor in the non-solvent bath also advantageously removes the supporting fluid from the interior of the fiber.

According to this embodiment, the supporting fluid is generally selected from non-solvents for the polymer (PSI), and more specifically from water and aliphatic alcohols, preferably, aliphatic alcohols having a short chain, for example from 1 to 6 carbon atoms, more preferably methanol, ethanol and isopropanol, and mixtures comprising the same.

Blends of said preferred non-solvents, i.e. comprising water and one or more aliphatic alcohols can be used.

Preferably, the supporting fluid is selected from the group consisting of
water,
aliphatic alcohols as above defined, and mixture thereof.
Most preferably, the supporting fluid is water.

Tubular membranes, because of their larger diameter, are produced using a different process from the one employed for the production of hollow fiber membranes.

In its third embodiment the process of the invention comprises a step (ii) of casting the polymer solution into a tubular film over a supporting tubular material.

After the processing of the solution (SP) has been completed so as to obtain a film, in whichever form, as above detailed, said film is contacted with a non-solvent bath in step (iii). This step is generally effective for inducing the precipitation of the polymer (PSI) from the solution (SP). The precipitated polymer (PSI) thus advantageously forms the final membrane structure.

As used herein the term "non-solvent" is taken to indicate a substance incapable of dissolving a given component of a solution or mixture.

Suitable non-solvents for the polymer (PSI) are water and aliphatic alcohols, preferably, aliphatic alcohols having a short chain, for example from 1 to 6 carbon atoms, more preferably methanol, ethanol and isopropanol. Blends of said preferred non-solvents, i.e. comprising water and one or more aliphatic alcohols can be used. Preferably, the non-solvent of the non-solvent bath is selected from the group consisting of —water,
aliphatic alcohols as above defined, and mixture thereof.
Further in addition, the non-solvent bath may comprise in addition to the non-solvent (e.g. in addition to water, to aliphatic alcohol or to mixture of water and aliphatic alcohols, as above detailed) small amounts (typically of up to 40% wt, with respect to the total weight of the non-solvent bath, generally 25 to 40% wt)) of a solvent for the polymer (PSI). Use of solvent/non-solvent mixtures advantageously allows controlling the porosity of the membrane. The non-solvent is generally selected among those miscible with the solvent (S) used for the preparation of the solution (SP). Preferably the non-solvent in the process of the invention is water. Water is the most inexpensive non-solvent and it can be used in large amounts. The solvent (S) is advantageously selected so as to be miscible and soluble in water, which is an additional advantage of the method of the present invention.

The non-solvent in the precipitation bath is usually held at a temperature of at least 0° C., preferably of at least 15° C., more preferably of at least 20° C. The non-solvent in the precipitation bath is usually held at a temperature of less than 90° C., preferably of less than 70° C., more preferably of less than 60° C.

The temperature gradient between the cast film and the non-solvent bath may influence the pore size and/or pore distribution in the final membrane as it affects the rate of precipitation of the polymer (PSI) from the solution (SP). If precipitation is rapid, a skin will generally form on the surface of the cast film in contact with the non-solvent which will typically slow down the diffusion of the non-solvent in the bulk of the polymer solution leading to a membrane with an asymmetric structure. If precipitation is slow, the pore-forming liquid droplets of the solvent-rich liquid phase, which forms upon contact with the non-solvent, usually tend to agglomerate while the polymer solution is still fluid. As a consequence the membrane will have a more homogeneous, symmetrical structure. The appropriate temperature of the non-solvent bath can be determined for each specific case with routine experiments.

Pore forming agents are generally at least partially, if not completely, removed from the membrane in the non-solvent bath in step (iii)

Once removed from the precipitation bath the membrane may undergo additional treatments, for instance rinsing. As a last step the membrane is typically dried.

The invention further pertains to a membrane which can be obtained by the method as above described.

Yet another object of the invention is hence a microporous membrane comprising a polymer (PSI), as above detailed, said membrane possessing a gravimetric porosity ($\varepsilon_m$) of 20 to 90% and comprising pores, wherein at least 90% by volume of the said pores has an average pore diameter of less than 5 µm.

The term "membrane" is used herein in its usual meaning, that is to say it refers to a discrete, generally thin, interface that moderates the permeation of chemical species in contact with it. This interface may be molecularly homogeneous, that is, completely uniform in structure (dense membrane), or it may be chemically or physically heterogeneous, for example containing voids, holes or pores of finite dimensions (porous membrane).

Membranes manufactured according to the method of the present invention are porous membranes, which can be generally characterized by their average pore diameter and the porosity, i.e. the fraction of the total membrane that is porous.

Membranes having a uniform structure throughout their thickness are generally known as symmetrical membranes; membranes having pores which are not homogeneously distributed throughout their thickness are generally known as asymmetric membranes. Asymmetric membranes are characterized by a thin selective layer (0.1-1 µm thick) and a highly porous thick layer (100-200 µm thick) which acts as a support and has little effect on the separation characteristics of the membrane.

Membranes can be in the form of a flat sheet or in the form of tubes. Tubular membranes are classified based on their dimensions in tubular membranes having a diameter greater than 3 mm; capillary membranes, having a diameter comprised between 0.5 mm and 3 mm; and hollow fibers having a diameter of less than 0.5 mm. Oftentimes capillary membranes are also referred to as hollow fibres.

Flat sheet membranes are generally preferred when high fluxes are required whereas hollow fibres are particularly advantageous in applications where compact modules with high surface areas are required.

Depending on their applications membranes may also be supported to improve their mechanical resistance. The support material is selected to have a minimal influence on the selectivity of the membrane.

Typically the membrane of the invention has an asymmetric structure.

The gravimetric porosity of the membrane may range from 20 to 90%, preferably from 30 to 80%.

As explained, average diameter of pores (also referred to as "voids") can be measured taking SEM picture from surfaces of fractured sections of the microporous membrane. Fractured sections are obtained fracturing the microporous membrane in liquid nitrogen in a parallel direction to the intended direction of flow through the membrane; fracturing in the said conditions is efficient in ensuring geometry and morphology to be preserved and avoiding any ductile deformation.

Manual or automated analysis of SEM pictures taken at suitable magnification/resolution enables delivering data regarding average diameter of pores.

The expression "average diameter" is meant to indicate that for pore sections of non-spherical shape, an averaged diameter is computed considering average between longest axis and shortest axis perpendicular thereto, while for spherical shapes, the actual geometrical diameter is to be taken as average diameter.

The pores may have an average diameter of at least 0.001 µm, of at least 0.005 µm, of at least 0.01 µm. The pores may have an average diameter of at most 5 µm, preferably at most 4 µm, even more preferably at most 3 µm.

The microporous membrane of the invention generally possesses a water flux permeability, at a pressure of 1 bar and at a temperature of 23° C., of at least 300, preferably at least 400, more preferably at least 500 l/(h×m²).

Should the disclosure of any patents, patent applications, and publications which are incorporated herein by reference conflict with the description of the present application to the extent that it may render a term unclear, the present description shall take precedence.

The invention will be now described in more details with reference to the following examples, whose purpose is merely illustrative and not intended to limit the scope of the invention.

Raw Materials

PSI is a polysulfone isosorbide polymer of molecular formula:

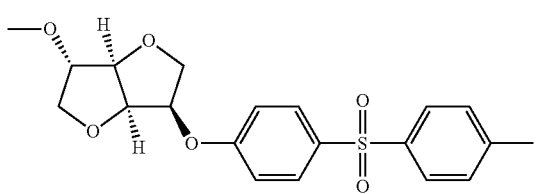

possessing a $M_w$ of between 94 000 and 99 000, and a polydispersity index of 1.7 to 1.8, available under the form of prills or "soft pellets"; before being used for the preparation of the dope solutions, PSI was dried in oven for 2 hours at 50° C., so as to remove moisture.

VERADEL® 3000 P polyethersulfone (PESU) produced by Solvay Specialty Polymers.

UDEL® 3500 P polysulfone (PSU) produced by Solvay Specialty Polymers.

PEG 200 is polyethylene glycol $M_w$ 200 purchased by Sigma-Aldrich.

PEG 6000 is polyethylene glycol $M_w$ 6000 purchased by Sigma-Aldrich.

PVP K10 is polyvinylpirrolidone $M_w$ 10000 purchased by Sigma-Aldrich.

PVP K90 is polyvinylpirrolidone $M_w$ 360000 purchased by Sigma-Aldrich.

Ethylene glycol (EthyGly) is purchased by Sigma-Aldrich.

Glycerol (Gly) is purchased by Sigma-Aldrich.

General Procedure for the Manufacture of the Solution of Sulfone Polymer for Membrane Manufacture.

Solutions (SP) comprising the ingredients listed in Table 1 were prepared according to the following procedure.

PSI polymer, polyhydric alcohol and pore forming agent were firstly introduced in a 2 l glass bottle, and then the solvent was added at room temperature.

The bottle was then introduced in a heating oil bath and an IKA head stirrer model RW 20 Digital was used to mix the compound in order to promote the solubilization. At first very high velocity (2000 rpm) was used in order to reach an optimal dispersion of the different components. Then lower velocity (200-300 rpm) was maintained for 2 hours in order to reach a complete dissolution. Finally the bottle was left standing at the temperature of the spinning process (30° C. or 80° C. depending of the trial) for at least 12 hours in order to remove air bubbles.

Ingredients are listed in the following Table 1:

TABLE 1

| Trial # | Polymer (% w/w) | Additives (% w/w) | Solvent (% w/w) |
|---|---|---|---|
| 10C | PSI 18% | PEG200 30% + EthyGly 2% | NMP 50% |
| 11C | PSI 18% | PEG200 40% + Gly 6% | NMP 36% |
| 13 | PSI 18% | PEG200 40% + EthyGly 2% + Gly 4% | NMP 36% |
| 14 | PSI 18% | PEG200 30% + EthyGly 2% + Gly 12% | NMP 40% |
| 15C | PES 18% | PVP K10 5% + Water 6.7% | NMP 70.3% |
| 16C | PSU 18% | PVP K90 5% + Water 2% | NMP 75% |
| 17C | PES 18% | PEG200 40% + EthyGly 2% + Gly 4% | NMP 36% |
| 18C (*) | PSU 18% | PEG200 40% + EthyGly 2% + Gly 4% | NMP 36% |

(*) Dope solution so obtained was instable and gave phase separation phenomena shortly after being prepared, so that it could not be extruded/spinned in fiber-forming apparatus.

Determination of the Viscosity of the Solution (SP)

With the aim to measure viscosity values, a rotational steady state shear measurements were performed using a Rheometric Scientific "RFS III" rheogoniometer in the concentric cylinder configuration (Couette). Flow curves were obtained with a sweep performed from the lowest obtainable shear rate (0.02 s$^{-1}$) to the highest defined by the maximum torque that the instrument can reach. In all the considered cases, a quite large Newtonian range was observed. Viscosity values summarized in following table 2 represent the Newtonian plateau of the flow curves at 30° C.

TABLE 2

| Trial # | Viscosity at 30° C. (cP) |
|---|---|
| 10C | 6170 |
| 11C | 25230 |
| 13 | 23554 |
| 14 | 6620 |
| 15C | 11420 |
| 16C | 10680 |
| 17C | 13166 |

General Procedure for the Manufacture of Hollow Fiber Membranes

FIG. 1 is a simplified scheme of the hollow fiber spinning machine used for manufacturing hollow fiber membrane, wherein 1 is the dope solution tank equipped with a feeding pump, 2 is the bore fluid tank, equally equipped with an injection pump, 3 is the spinneret or annular die, 4 is the nascent hollow fiber, 5 is the air gap, 6 is the coagulation bath and 7 is the so obtained hollow fiber.

Figure 2:
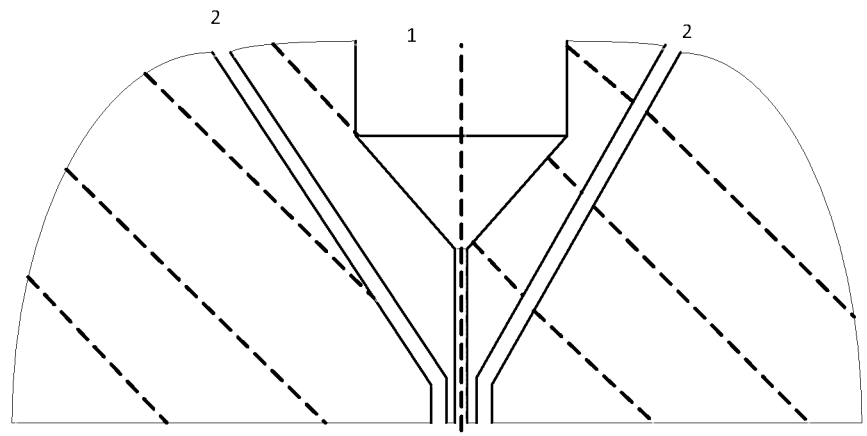
FIG. 2 is a schematic cut of the spinneret (annular die), through a plane parallel to the fiber extrusion flow.

FIG. 2 is a schematic cut of the spinneret (annular die), through a plane parallel to the fiber extrusion flow, wherein 1 is the bore fluid die, and 2 is the annular die feeding the dope solution.

Figure 3:
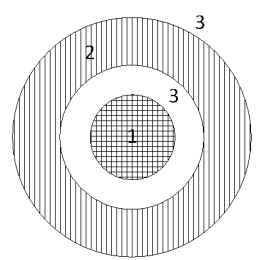
FIG. 3 is a schematic cut of the spinneret (annular die), through a plane perpendicular to the fiber extrusion flow.

FIG. 3 is a schematic cut of the spinneret (annular die), through a plane perpendicular to the fiber extrusion flow, wherein 1 is the extruded/spinned bore fluid, 2 is the extruded/spinned dope solution, and 3 is the body of the spinneret/annular die.

Polymeric hollow fibers were formed by extruding the dope solutions, as detailed above, through an annular aperture (the spinneret 3 in FIG. 1). Hollow fibers were prevented from collapsing by coextruding water as bore fluid in the center of the annulus, which was fed at a flow rate ranging from 1-10 ml/min. The rotating (coagulation) water bath (6 in FIG. 1) enabled producing coagulation by phase inversion. The temperature of the apparatus was controlled by a PID system so as to maintain a temperature of 30° C. The spinneret geometry used in the extrusion part had an internal diameter ($ID_{sp}$) of 800 μm, an external one of 1600 μm ($OD_{sp}$) and a bore diameter of 300 μm was used.

Characterization of the Hollow Fiber Membranes

Water Flux Permeability Measurements:

Water flux (J) through each membrane at given pressure, is defined as the volume which permeates per unit area and per unit time. The flux is calculated by the following equation:

$$J = \frac{V}{A \Delta t}$$

V (l) is the volume of permeate, A (m$^2$) is the membrane area, and Δt (h) is the operation time. J is hence measured in l/(h×m$^2$).

Water flux measurements were conducted at room temperature (23° C.) using a cross-flow configuration under a constant pressure of 1 bar. Three specimens of hollow fibers with a total area of about 35 cm$^2$ were cut from the membranes manufactured and stored in a water/glycerol 80/20 w/w solution before drying and placing them in a glass testing holder. Fibers were tested in lumen-shell (In-Out) configuration. Results are summarized in Table 3.

TABLE 3

| Trial # | Permeability l/(h × m²) |
|---|---|
| 10C | 82 |
| 11C | 200 |
| 13 | 634 |
| 14 | 675 |
| 15C | 160 |
| 16C | 15 |
| 17C | 290 |

Gravimetric Porosity and Pores Size

Membrane porosity ($\varepsilon_m$) was determined according to the gravimetric method, as detailed below. Perfectly dry membrane pieces were weighed and impregnated in isopropylic alcohol (IPA) for 24 h; after this time, the excess of the liquid was removed with tissue paper, and membranes weight was measured again. Finally, from the dry and the wet weight of the sample, it is possible to evaluate the porosity of the membrane using the following formula $$\varepsilon_m(\%) = \frac{Ww - Wd/\rho w}{Ww - Wd/\rho w + \left(\frac{Wd}{\rho P}\right)} \times 100$$

where $W_w$ is the weight of the wet membrane, $W_d$ is the weight of the dry membrane, $\rho_w$ is the IPA density (0.785 g/cm³) and $\rho_P$ is the polymer density (equal to 1.37 g/cm³ for the polymer (PSI) used). For all membranes types, at least three measurements were performed; then, average values and corresponding standard deviations were calculated.

Samples of membranes were fractured in liquid nitrogen in a direction parallel to the intended flow through the membrane, and manually analysed for determining pore sizes. Results are provided in Table 4

TABLE 4

| Trial # | Pores size | Porosity (%) |
|---|---|---|
| 10C | Most of pores possessing average diameter of 90 μm or beyond (finger-like morphology) | 82 |
| 11C | Most of pores possessing average diameter of 50 μm or beyond (macro-voids morphology) | 82 |
| 13 | No pore having average diameter exceeding 3 μm (spongy morphology) | 80 |
| 14 | n.d. | 79 |
| 15C | n.d. | 72 |
| 16C | n.d. | 85 |
| 17C | Most of pores possessing average diameter of 90 μm or beyond (finger-like morphology, with outside continuous shell) | 83 |

Rupture Pressure (Burst Pressure)

Rupture pressure (Burst pressure) was measured using the porosimeter, increasing the pressure until the rupture of the fibers.

TABLE 5

| Trial # | Burst pressure (bar) |
|---|---|
| 10C | 7 |
| 11C | 11 |
| 13 | 13 |
| 14 | 8 |
| 15C | 10 |
| 16C | 8 |
| 17C | 12 |

Mechanical (Tensile) Test

All the tests on the extruded fibers were performed following the ASTM D3032 method with an initial length L0 of 125 mm and velocity of 125 mm/min.

All the tested fibers were stored in water without any supplementary treatment. During the tests the fibers were maintained wet: each test involved at least four-five iterations on several fiber specimens.

Form these measurements, apparent modulus and the strain at break were determined.

TABLE 6

| Trial # | Modulus (MPa) | Strain @ break (%) |
|---|---|---|
| 10C | 81 | 38 |
| 11C | 88 | 40 |
| 13 | 167 | 42 |
| 14 | 151 | 42 |
| 15C | 101 | 56 |
| 16C | 95 | 55 |
| 17C | 88 | 30 |

The invention claimed is:

1. A polyaryl ether sulfone polymer solution (SP) comprising:

at least one sulfone polymer (PSI) having recurring units, wherein more than 50% moles, with respect to all the recurring units of the sulfone polymer (PSI), are recurring units ($R_{PSI}$) selected from the group consisting of those of formulae ($R_{PSI}$-1) and ($R_{PSI}$-2) herein below:

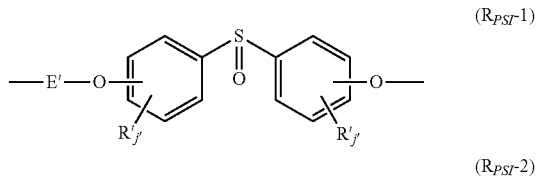

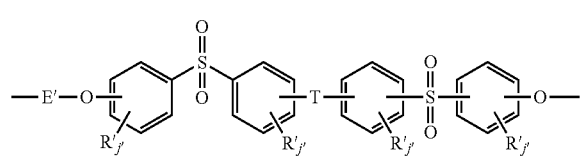

wherein:
each of E', equal to or different from each other and at each occurrence, is selected from the group consisting of formulae (E'-1) to (E'-3):

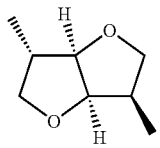
(E'-I)

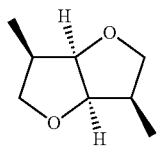
(E'-II)

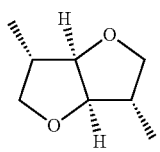
(E'-III)

each R' is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j' is zero or an integer of 1 to 4;

T is a bond or a divalent group optionally comprising one or more than one heteroatom;

at least one polar organic solvent (S); and at least one mixture (PHA) of polyhydroxyl aliphatic alcohols having from 1 to 6 carbon atoms or derivatives thereof, said mixture (PHA) comprising at least one ethylene glycol compound (EthyGly), and at least one glycerol compound (Gly), wherein the ethylene glycol compound (EthyGly) is selected from the group consisting of ethylene glycol, diethylene glycol (DEG), triethylene glycol (TEG), aliphatic mono-ether and mono-ester derivatives; and wherein the overall concentration of the mixture (PHA) in the polyaryl ether sulfone polymer solution (SP) does not exceed 20% by weight, based on the total weight of the polyaryl ether sulfone polymer solution (SP), wherein said polyaryl ether sulfone polymer solution (SP) further comprises at least one pore forming agent, wherein the pore forming agent is a polyethyleneglycol (PEG) having a molecular weight of at least 200, and wherein the PEG is present in an amount ranging from 30 to 40% by weight, with respect to the total weight of the polyaryl ether sulfone polymer solution (SP).

2. The polyaryl ether sulfone polymer solution (SP) of claim 1, wherein recurring units ($R_{PSI}$) of the sulfone polymer (PSI) are recurring units of any of formulae ($R_{PSI}$-1a), ($R_{PSI}$-1b), ($R_{PSI}$-1c), ($R_{PSI}$-2a), ($R_{PSI}$-2b), and ($R_{PSI}$-2c):

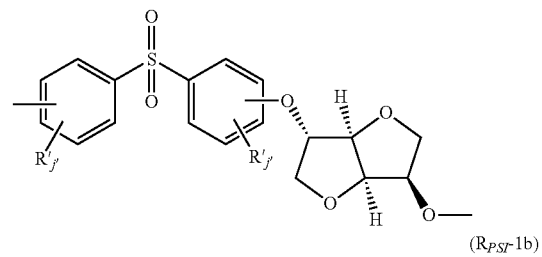
($R_{PSI}$-1a)

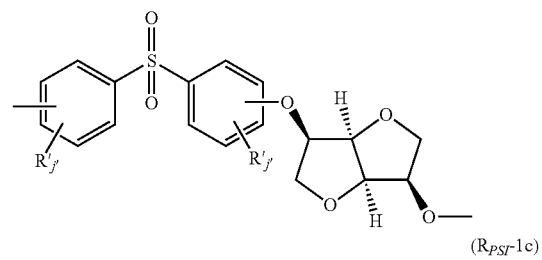
($R_{PSI}$-1b)

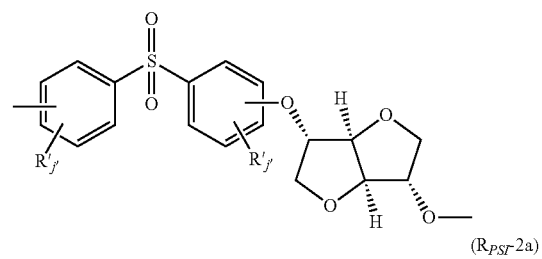
($R_{PSI}$-1c)

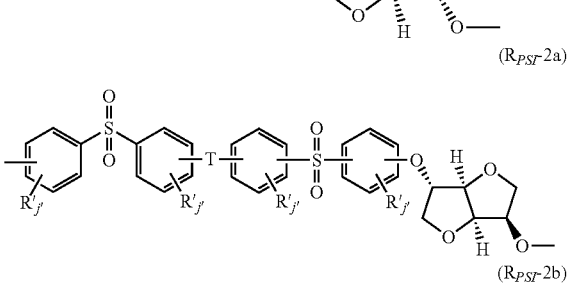
($R_{PSI}$-2a)

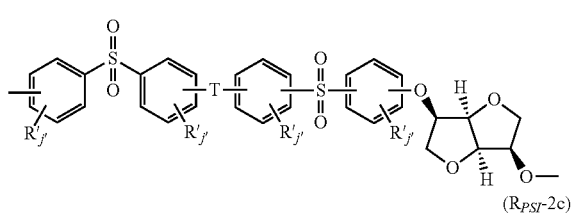
($R_{PSI}$-2b)

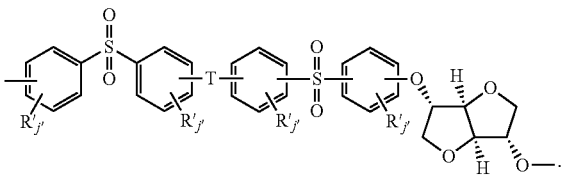
($R_{PSI}$-2c)

3. The polyaryl ether sulfone polymer solution (SP) of claim 1 comprising an overall concentration of the solvent (S) in the polyaryl ether sulfone polymer solution (SP) of at least 20% by weight and not exceeding 70% by weight, based on the total weight of the polyaryl ether sulfone polymer solution (SP).

4. The polyaryl ether sulfone polymer solution (SP) of claim 1, wherein the mixture (PHA) in said polyaryl ether sulfone polymer solution (SP) comprises at least one compound (Gly) selected from the group consisting of glycerol, aliphatic mono-ester and di-ester derivatives thereof, aliphatic mono- and di-ether derivatives thereof, glycerol carbonate, and glycerol acetals derived from aliphatic aldehydes.

5. The polyaryl ether sulfone polymer solution (SP) according to claim 1, wherein the overall concentration of the mixture (PHA) in the polyaryl ether sulfone polymer solution (SP) is of at least 1% by weight, based on the total weight of the polyaryl ether sulfone polymer solution (SP).

6. The polyaryl ether sulfone polymer solution (SP) according to claim 1, wherein the weight ratio between compound (EthyGly) and compound (Gly) is comprised between 10:90 to 90:10.

7. The polyaryl ether sulfone polymer solution (SP) according to claim 1, wherein T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

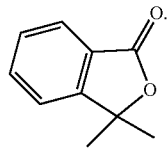

8. The polyaryl ether sulfone polymer solution (SP) according to claim 5, wherein the overall concentration of the mixture (PHA) in the polyaryl ether sulfone polymer solution (SP) does not exceed 15% by weight, based on the total weight of the polyaryl ether sulfone polymer solution (SP).

9. The polyaryl ether sulfone polymer solution (SP) according to claim 5, wherein the overall concentration of the mixture (PHA) in the polyaryl ether sulfone polymer solution (SP) does not exceed 14% by weight, based on the total weight of the polyaryl ether sulfone polymer solution (SP).

* * * * *